June 17, 1958 R. J. SHANK 2,839,604

PULSE-CODE COMMUNICATION SYSTEM

Filed Oct. 5, 1956 2 Sheets-Sheet 1

INVENTOR.
Robert J. Shank,

BY

ATTORNEY

June 17, 1958 R. J. SHANK 2,839,604

PULSE-CODE COMMUNICATION SYSTEM

Filed Oct. 5, 1956 2 Sheets-Sheet 2

INVENTOR.
Robert J. Shank,
BY.

ATTORNEY.

2,839,604

PULSE-CODE COMMUNICATION SYSTEM

Robert J. Shank, Encino, Calif., assignor to Hughes Aircraft Company, Culver City, Calif., a corporation of Delaware Application October 5, 1956, Serial No. 614,273

11 Claims. (Cl. 178—66)

This invention relates generally to pulse-code communication systems, and more particularly relates to a method of and system for transmitting intelligence by varying the frequency of a carrier wave in accordance with coded signals.

In any system for transmitting intelligence over an appreciable distance the problems of fading and of multipath delays are present. Fading of a transmitted carrier wave occurs due to variations of the reflecting ionosphere. The amount of fading at any particular time usually is related to the frequency of the wave. Furthermore, a transmitted carrier wave may be reflected from different reflecting layers, so that the paths of the reflected wave have different lengths. Consequently, the received waves will arrive at different times which causes considerable difficulties in the demodulation of such waves. Various methods have been suggested in the past for overcoming the effects of fading. For example, it has been proposed that the frequency of a carrier wave be varied continuously. At the same time the amplitude of the carrier wave is modulated to transmit intelligence. In this case it is, of course, necessary to use a wide-band receiver which will pass all the frequencies of the amplitude-modulated and frequency-varied carrier wave. Since the carrier wave is frequency modulated fading will only occur at certain frequencies at any time and hence the amplitude of the received carrier wave may be smoothed to recover the original intelligence.

Another communication system utilizes a carrier wave having a frequency which varies linearly between two predetermined frequencies to indicate, for example, a mark signal, while a space signal is communicated by the absence of the carrier wave. Such a system is highly immune to fading for the reasons above indicated, that is, because fading usually occurs only at a particular frequency. Furthermore this system is also fairly immune to multipath delays. Since the frequency of the carrier wave varies in a predetermined manner as a function of time it is possible to select one of the reflected signals while rejecting the others on the basis of the time-frequency relationship of the received wave. However, this prior art communication system requires relatively expensive apparatus at the receiver. The receiver includes a large number of band-pass filters, each having a narrow pass-band so as to be sensitive only to a small frequency range corresponding to that of a received mark signal at a predetermined instant of time. These band-pass filters must then be scanned in sequence and at the proper time, and to this end the receiver must be exactly synchronized with the transmitter. This synchronizing of the receiver also presents considerable difficulties and adds to the equipment required for the receiver. In this prior art system a signal is only transmitted to communicate a mark signal while the absence of a signal indicates a space signal.

Such a transmission system where only mark signals are transmitted is theoretically quite adequate, but usually breaks down in the presence of noise, fading or multipath delays. However, it has long been recognized that a certain amount of redundancy of the transmitted intelligence is highly desired. While a system providing redundancy will, of course, reduce the speed of the data transmission, it becomes highly immune to severe effects of fading and multipath delays.

It is also possible to reduce the effects of fading by utilizing a relatively narrow pulse for transmitting the intelligence. However, in that case the duty cycle of the power amplifier of the transmitter is quite small so that it becomes difficult to transmit sufficient power. Therefore it would be desirable to transmit for each bit of intelligence a relatively long pulse to improve the power amplifier duty cycle. The effects of multipath delay may be taken into account by providing a sufficient period of time between successive transmitted signals or pulses.

It is accordingly an object of the present invention to provide a pulse-code transmission system which is highly immune to the effects of multipath delays and which is also immune to noise.

Another object of the invention is to provide a communication system for transmitting coded data which utilizes a carrier wave of constant amplitude and, therefore, has a high duty cycle of the power amplifier at the transmitter and which fully utilizes the available bandwidth.

A further object of the present invention is to provide a communication system of the type referred to which requires relatively little equipment at the receiver and which may be made immune to the effects of fading.

In accordance with the present invention a carrier wave is modulated at the transmitter in such a manner that its frequency varies either linearly or in accordance with some other predetermined function from a first frequency to a second frequency to represent, for example, a mark signal. A space signal is represented by modulating the frequency of the carrier wave in a similar manner from the second to the first frequency. Accordingly both mark and space signals are positively transmitted and are distinguished from each other by a frequency variation of the carrier wave in opposite directions. The frequency modulation of the carrier wave may be carried out in any conventional manner. For example, there may be provided an oscillator which develops a wave having a frequency which periodically changes as a function of time between two frequencies. The frequency of this oscillator may now be selectively hetrodyned by means of a mark and a space oscillator in accordance with a mark or space signal to be transmitted.

Further in accordance with the present invention the mark and space signals are distinguished from each other at the receiver by time discrimination. For example, the received carrier wave may be passed through two frequency responsive delay networks which may delay the carrier wave portion corresponding to a first frequency in such a manner that it substantially coincides in time with a carrier wave portion having a second frequency. As a result a mark signal is, for example, compressed into a pulse having a time duration which is short compared to that of the transmitted mark signal, while the space signal is expanded in time.

The mark and space signals may be distinguished from each other either by providing two different networks with opposite frequency responsive characteristics. Alternatively, two oscillators may be provided at the receiver so that in one channel the frequency of the mark signal changes from the first to the second frequency while in the second channel the frequency of the mark signal varies between the second and the first frequency. In this manner identical networks provided in the mark and space channels will respectively compress the mark signal and the space signal into pulses of short duration while the undesirable signals are stretched out. It will be obvious that since all the energy received is compressed into the desired pulse the corresponding compressed pulse will have a higher amplitude than that of the undesired and stretched pulse. Accordingly the pulses may be detected by a combined detector and amplitude discriminator to derive the transmitted intelligence.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
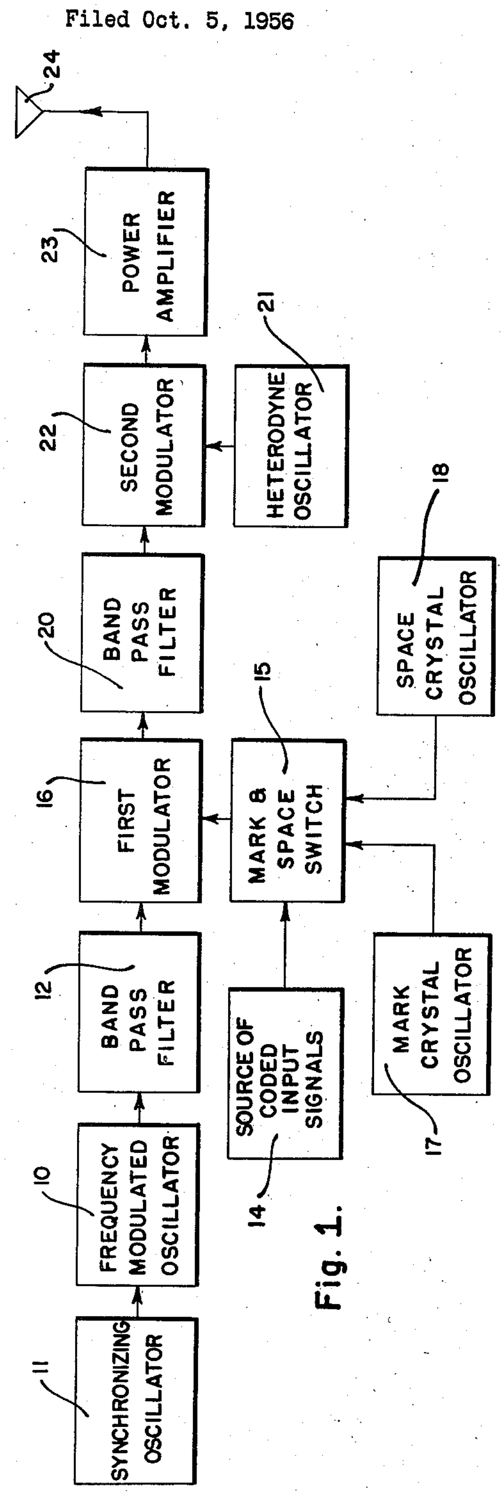
Fig. 1 is a block diagram of a transmitter forming part of the pulse communication system of the present invention.

Referring now to the drawings wherein like elements are designated by the same reference characters, and particularly to Fig. 1, there is illustrated a transmitter forming part of the pulse-code communication system of the present invention. The transmitter of Fig. 1 includes a frequency-modulated oscillator 10, the frequency of which is controlled by synchronizing oscillator 11. By way of example, the frequency of oscillator 10 may vary from 5 to 6 kilocycles per second( kc.) while the frequency of synchronizing oscillator 11 may be 125 cycles per second. It is to be understood, however, that the frequencies and frequency ranges to be given during the subsequent description are by way of example only and that these frequencies may be varied depending upon the particular application.

The frequency of oscillator 10 may be controlled electronically by synchronizing oscillator 11 by a conventional reactance tube circuit. Alternatively, the oscillator frequency may be varied or modulated by periodically varying, for example, the capacitance of a tuned frequency-determining circuit. The repetition rate of the frequency modulation of the wave developed by oscillator 10 is controlled by synchronizing oscillator 11. For example, a time of somewhat less than 8 milliseconds may be required to vary the oscillator frequency from 5 to 6 kc., whereupon a fraction of a millisecond is used to return the oscillator frequency from 6 to 5 kc. Preferably the frequency of oscillator 10 is varied as a linear function of time. However, it is feasible to vary the oscillator frequency as any other monotonic function of time.

A band-pass filter 12 having a pass band from 5 to 6 kc. may be connected to the output of oscillator 10 to reject frequencies generated while the oscillator frequency returns rapidly from 6 to 5 kc. However, band-pass filter 12 may be omitted. The wave generated by oscillator 10 is a continuous wave having a constant amplitude.

Preferably, in accordance with the present invention, a positive signal is transmitted for both a mark signal and a space signal. To this end there is provided a source of coded input signals 14 which develops the mark and space signals required to transmit intelligence. Input signal source 14 controls a mark and space switch 15 which in turn is coupled to a first modulator 16 having its other input connected to the output of band-pass filter 12. Mark and space switch 15 controls the transmission of waves from either a mark crystal oscillator 17 or a space crystal oscillator 18. By way of example, the frequency of the wave developed by mark crystal oscillator 17 may be 500 kc., while that of the wave developed by space crystal oscillator 15 may be 511 kc.

In response to a mark signal from signal source 14 the mark and space switch 15 will transmit the wave developed by mark crystal oscillator 17 and impress it on first modulator 16. Consequently, the sum product of the frequencies developed by frequency modulated oscillator 10 and by mark oscillator 17 will be a carrier wave having a frequency variation from 505 to 506 kc., representing a mark signal. Let it now be assumed that a space signal is developed by signal source 14. Now mark and space switch 15 will open a transmission path between space oscillator 18 and first modulator 16. Taking now the difference product of the frequencies of the waves developed by oscillators 10 and 18, a wave is obtained having a frequency varying from 506 to 505 kc. to represent a space signal.

A band-pass filter 20 is coupled to the output of first modulator 16 and has, for example, a pass-band from 505 to 506 kc. to reject other modulation products developed by modulator 16. In view of the fact that band-pass filter 20 is provided in the output of modulator 16 it may be unnecessary to provide band-pass filter 12 between oscillator 10 and modulator 16.

Before the frequency-modulated carrier is transmitted it may be desirable to heterodyne it once more, thereby to increase the mean frequency of the carrier wave. For this purpose there may be provided a heterodyne oscillator 21 which may develop a carrier wave at a frequency of 19,495 kc. The oscillator 21 may be considered the channel selector. The output wave of heterodyne or channel selector oscillator 21 is impressed on second modulator 22 which is also connected to the output of band-pass filter 20. Accordingly, the sum product of the frequencies of the waves developed by oscillator 21 and of the wave passed by band-pass filter 20 is for a mark signal 20,000 to 20,001 kc. and for a space signal 20,001 to 20,000 kc.

The continuous wave having a constant amplitude and a frequency varying between 20,000 and 20,001 kc. may be amplified by power amplifier 23 and transmitted into space by antenna 24. Since the wave amplified by power amplifier 23 has a constant amplitude the duty cycle of the power amplifier is one, thus increasing the power efficiency.

Figure 3:
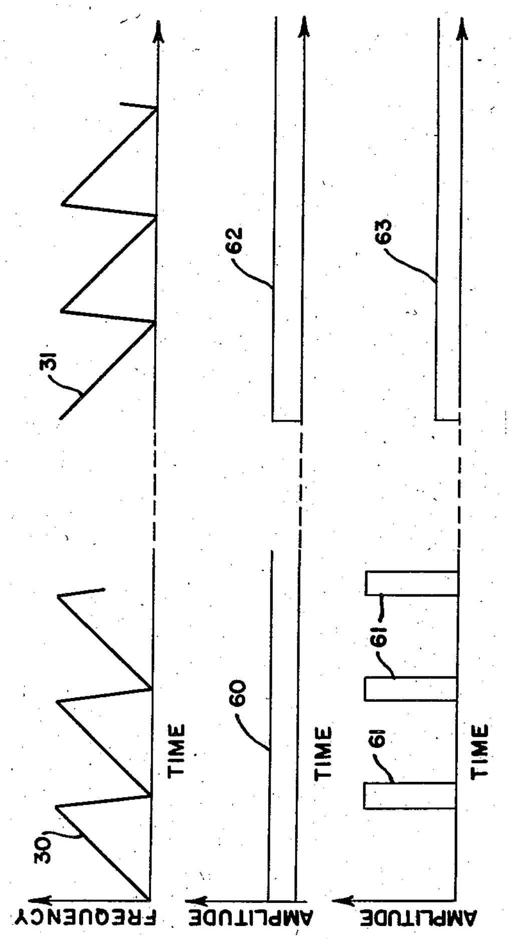
Fig. 3 is a graph showing the frequencies and amplitudes of signals obtained at various points of the transmitter of Fig. 1 and of the receiver at Fig. 2 plotted at a function of time.

Referring now to Fig. 3, curve 30 represents the frequency of a wave as a function of time. Thus for a mark signal the output wave of first modulator 16 would vary, as shown by curve 30, from 505 to 506 kc. For a space signal the frequency relationship as a function of time is indicated by curve 31. Consequently, the output wave obtained from first modulator 16 varies from 506 to 505 kc. as a function of time to represent a space signal. While curves 30 and 31 show a linear relationship of the frequency as a function of time, it is to be understood, as pointed out earlier, that any other monotonic relationship of the frequency as a function of time might be selected as long as the mark and space signals may be distinguished from each other on the basis of time discrimination, as will be more fully explained hereinafter.

Figure 2:
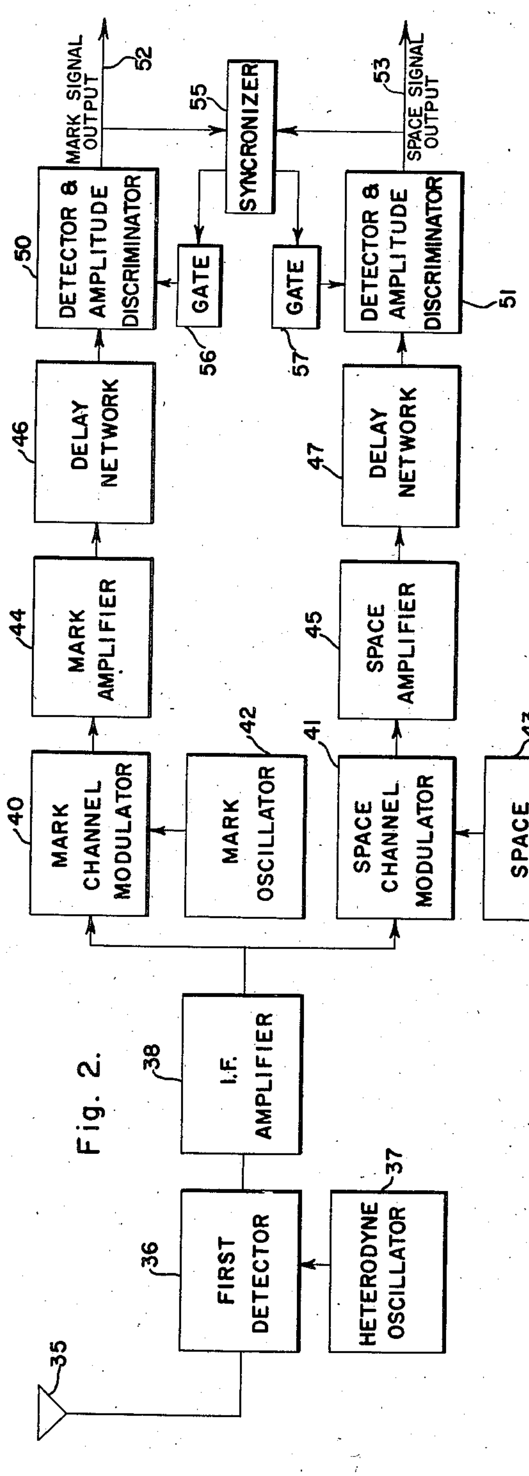
Fig. 2 is a block diagram of a receiver in accordance with the present invention.

Referring now to Fig. 2, there is illustrated one embodiment of a receiver in accordance with the present invention for receiving the frequency-modulated carrier wave transmitted by antenna 24. This frequency-modulated carrier wave is intercepted by antenna 35 and impressed on a first detector 36 coupled to a heterodyne oscillator 37. Heterodyne oscillator 37 develops a wave having a frequency of 19,495 kc. which is the same as that of heterodyne oscillator 21 at the transmitter. The difference product of the received carrier wave and of wave developed by heterodyne oscillator 37 is 505 to 506 kc. or 506 to 505 kc. as the case may be, and this wave may be amplified by intermediate-frequency amplifier 38, which should have a pass-band from 505 to 506 kc.

Teh amplified intermediate-frequency wave obtained from amplifier 38 is impressed simultaneously on mark channel modulator 40 and space channel modulator 41. A mark oscillator 42 is coupled to mark channel modulator 40, while a space oscillator 43 is coupled to space channel modulator 41. In accordance with the example herein given, the frequency of the wave developed by mark oscillator 42 may be 500 kc., while that of the wave developed by space oscillator 43 may be 511 kc. Consequently, by taking the difference product of the frequencies of the intermediate frequency wave and of the wave developed by mark oscillator 42, a wave is obtained having a frequency from 5 to 6 kc. for a mark signal and having a frequency from 6 to 5 kc. for a space signal. Simultaneously, by taking the difference product between the frequency of the wave developed by space oscillator 43 and that of the intermediate frequency wave obtained from amplifier 38, an output wave is obtained having a frequency from 5 to 6 kc. for a space signal and from 6 to 5 kc. for a mark signal. Consequently, it will be obvious that in the mark channel the desired signal varies from 5 to 6 kc. while in the space channel the desired signal also varies from 5 to 6 kc., the undesired signal in each channel having a frequency varying from 6 to 5 kc.

A mark amplifier 44 and a delay network 46 are coupled in cascade to mark channel modulator 40. Similarly, a space amplifier 45 and delay network 47 are connected in cascade to space channel modulator 41.

Delay network 46 in the mark channel is frequency responsive and its function is to compress in time the desired signal, that is, the mark signal, while stretching or expanding the undesired signal, that is, the space signal, into a longer period of time than that of the transmitted space signal. By way of example, the duration of a transmitted space or mark signal may be about 8 milliseconds. Consequently, the portion of the mark signal having a frequency of 5 kc. at the beginning of the signal may, by way of example, be delayed approximately 8 to 9 milliseconds. The trailing portion of the mark signal having a frequency of 6 kc. may be delayed approximately 1 millisecond. Intermediate portions of the mark signal will be delayed corresponding time intervals by delay network 46. Accordingly, the entire mark signal may be compressed into a time interval, say 1 millisecond, following the occurrence of the transmitted mark signal. This is illustrated in Fig. 3, to which reference is now made. This curve 60 illustrates the amplitude of the transmitted signal which, as pointed out hereinbefore, is constant. The compressed mark signals, as shown by pulses 61, occur after the occurrence of the corresponding transmitted, frequency-modulated mark signals and have a much higher amplitude because their energy is compressed, say into one-eighth of the time of the transmitted signal.

Considering now the effect of an undesired space signal on the delay network 46 in the mark channel, the frequency of the transmitted signal varies as shown by curve 31 of Fig. 3. The amplitude of the transmitted space signal is shown by curve 62. When this space signal is passed through delay network 46 its initial wave portion has a frequency of 6 kc. and this frequency will be delayed, say by 1 millisecond. The last occurring wave portion of the space signal has a frequency of 5 kc. which will be delayed by, say 9 milliseconds. Accordingly, as shown by curve 63 the space signal will begin 1 millisecond after the beginning of the space signal and will extend 9 milliseconds beyond the trailing portion of the space signal. Consequently, its amplitude can be no larger than that of a transmitted signal as indicated at 62.

It will now be obvious that the desired mark signal may be distinguished from the undesired space signal on the basis of their respective amplitudes. To this end a detector and amplitude discriminator 50 may be coupled to the output of delay network 46, thereby to recover the mark signal and to suppress the space signal. In other words, the combined detector and amplitude discriminator 50 may be set to detect only waves having an amplitude in excess of a predetermined amplitude, that is, a mark pulse and simultaneously to detect the envelope of the wave. This mark signal may be derived from output lead 52. If desired a conventional automatic gain control system may be provided in the receiver of Fig. 2 to maintain the amplification substantially constant in spite of variation of the received signal strength.

Delay network 47 may be identical to delay network 46 and operates in the same fashion. As previously pointed out, the desired space signal in the space channel has a frequency variation from 6 to 5 kc. Again, the desired space signal is compressed with respect to time and has a higher amplitude than that of the stretched mark signal. By means of detector and amplitude discriminator 51 coupled to delay network 47 the high amplitude space pulse may be discriminated from the low amplitude mark pulse and the space pulse may be detected to derive a space signal from output lead 53.

Delay networks 46 and 47 may, for example, consist of a suitable number of sections such as 10 to 50 of a constant resistance lattice having an inductive branch and a capacitive branch. The number of filter sections required depends on the fidelity demanded of the receiver and also on the desired duration of the output pulse obtained from the delay network.

If desired synchronizing gate pulses may be generated to maintain the detectors 50 and 51 inoperative except when a space or mark output pulse is expected to arrive. This may be accomplished in a manner conventional in the radar field by a synchronizer 55 responsive to the mark and space signals. To this end synchronizer 55 may be connected to output leads 52 and 53 to control in turn a pair of gates 56 and 57 having their outputs connected respectively to detectors 50 and 51 to control their operation.

Figure 4:
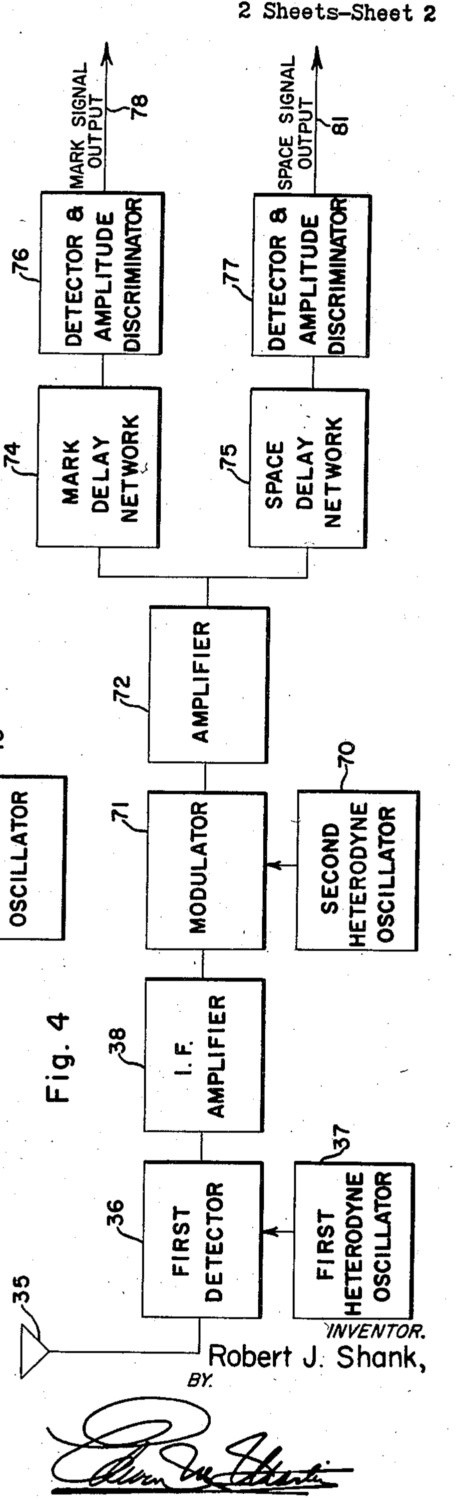
Fig. 4 is a block diagram of an alternative embodiment of the receiver of the present invention.

A modification of the receiver of the present invention is illustrated in Fig. 4, to which reference is now made. The receiver of Fig. 4 again includes an antenna 35, first detector 36 and first heterodyne oscillator 37 and an intermediate frequency amplifier 38, and the frequency of the wave obtained from amplifier 38 may again be from 505 to 506 kc. However, instead of providing separate mark and space oscillators there is provided in Fig. 4 a single second heterodyne oscillator 70 coupled to modulator 71, which is also coupled to the output of amplifier 38. The frequency of the second heterodyne oscillator 70 may, for example, be 500 kc. By forming the difference products between the frequency of the wave developed by amplifier 38, which is 505 to 506 kc., and the frequency of the wave developed by oscillator 70, the modulator 71 will develop an output wave having a frequency from 5 to 6 kc. for a mark signal and a frequency varying from 6 to 5 kc. for a space signal.

This wave may be amplified by amplifier 72 coupled to modulator 71 and having a pass band from 5 to 6 kc. This amplified frequency-modulated wave is impressed simultaneously on a mark delay network 74 and on a space delay network 75. These two networks must have different frequency response characteristics. The mark delay network 74 may have the same frequency characteristics as that of delay network 46 and 47 of the receiver of Fig. 2, and operates in the same manner as described hereinbefore. As a result the desired mark signal derived from mark delay network 74 will have a high amplitude while the undesired space signal has a low amplitude. By means of detector and amplitude discriminator 76 coupled to network 74 the desired mark signal may be discriminated from the undesired space signal and may be detected. The demodulated mark signal may be obtained from output lead 78.

Space delay network 75 may have such frequency response characteristics that it will compress the desired space signal and stretch the undesired mark signal. To this end it is necessary that the network delay a wave having a frequency of 6 kc. by say 9 milliseconds, while delaying a wave having a frequency of say 5 kc. by 1 millisecond. Wave portions having frequencies between 6 and 5 kc. will be delayed by corresponding time intervals. In a manner which will now be obvious the desired space signal having a frequency variation from 6 to 5 kc., will be compressed in time and have a much higher amplitude than that of the transmitted wave. For the same reason an undesired mark signal having a frequency variation from 5 to 6 kc. will be stretched or expanded in time and have a much smaller amplitude. Consequently, detector and amplitude discriminator 77 coupled to network 75 will accomplish the time discrimination and the demodulated space signal may be obtained from output lead 81.

It may be pointed out that a delay network such as network 75 will be somewhat more difficult to realize than the delay networks such as 46 and 47 required for the receiver of 42. On the other hand, the receiver of Fig. 4 does not require separate mark and space oscillators. Furthermore, only a single amplifier is required for both mark and space channels.

Obviously, synchronizing pulses may be applied to detectors 76 and 77 in the manner illustrated and described in connection with the receiver of Fig. 2.

If difficult communication conditions are encountered it is feasible to increase the period of time during which a mark or space signal is transmitted. If the received pulse is again compressed into the same small interval of time its amplitude will be correspondingly increased. Therefore this system will be less subject to noise and fading. Alternatively, it is feasible to integrate two or more subsequent but identical signals by means of a delay line technique. For such a system it is, of course, necessary to transmit each signal twice or more in succession. The disadvantages of these two systems is that the rate of transmission of the intelligence becomes much lower. This may be avoided by utilizing multichannel operation, that is, by transmitting different carrier waves of different frequencies simultaneously by means of separate antennae.

There has thus been disclosed a code-pulse communication system which is highly immune to fading in view of the fact that use is made of frequency diversity. Furthermore, the communication system of the present invention is highly immune to noise. This is so because any noise to be received would have to have the same frequency-time relationship as that of the carrier wave. Furthermore, noise may be further reduced by providing narrow time gating as discussed above. It has already been pointed out that the duty cycle of the power amplifier at the transmitter is substantially one, thus increasing the power efficiency. Finally, the communication system of the present invention requires but a small bandwidth which is proportional to the reciprocal of the duration of the compressed pulse obtained at the receiver. The time duration between successive compressed pulses provides a guard time to make the system highly immune to multipath delays. In other words, while a continuous wave is being transmitted it is still possible to compress the transmitted information into narrow pulses having a time interval between successive pulses which serves to reject other waves due to multipath delay.

What is claimed as new is:

1. A pulse-code communication system for transmitting pulse-coded mark and space intelligence signals between a transmitting station and a receiving station comprising a transmitting station including means for generating a carrier wave, means coupled to said generating means for modulating the frequency of said carrier wave as a predetermined function of time from a first predetermined frequency to a second predetermined frequency to represent a mark signal and for modulating the frequency of said carrier wave as a substantially linear function of time from said second to said first frequency to represent a space signal, and means coupled to said modulating means for transmitting said modulated carrier wave; a receiving station including means for receiving said modulated carrier wave, a first frequency responsive delay network coupled to said receiving means for delaying said carrier wave a first predetermined time interval when its frequency corresponds to said first frequency and for delaying said carrier wave a second predetermined time interval when its frequency corresponds to said second frequency, and a second frequency responsive delay network coupled to said receiving means for delaying said carrier wave by said first time interval when its frequency corresponds to said second frequency and for delaying said carrier wave by said second time interval when its frequency corresponds to said first frequency, and said predetermined time intervals being selected in such a manner that said first delay network compresses a mark signal into a period of time shorter than that of the transmitted mark signal to derive a mark pulse and stretches a space signal into a period of time longer than that of the transmitted space signal, while said second delay network compresses a space signal into a period of time shorter than that of the transmitted space signal to derive a space pulse and stretches a mark signal into a period of time longer than that of a transmitted mark signal.

2. A pulse-code communication system for transmitting pulse-coded mark and space intelligence signals between a transmitting station and a receiving station comprising a transmitting station including means for generating a carrier wave, means coupled to said generating means for modulating the frequency of said carrier wave as a substantially linear function of time from a first predetermined frequency to a second predetermined frequency to represent a mark signal and for modulating the frequency of said carrier wave as a substantially linear function of time from said second to said first frequency to represent a space signal, and means coupled to said modulating means for transmitting said modulated carrier wave; a receiving station including means for receiving said modulated carried wave, a first frequency responsive delay network coupled to said receiving means for delaying said carrier wave a first predetermined time interval when its frequency corresponds to said first frequency and for delaying said carrier wave a second predetermined time interval when its frequency corresponds to said second frequency, a second frequency responsive delay network coupled to said receiving means for delaying said carrier wave by said first time interval when its frequency corresponds to said second frequency and for delaying said carrier wave by said second time interval when its frequency corresponds to said first frequency, said predetermined time intervals being selected in such a manner that said first delay network compresses a mark signal into a period of time shorter than that of the transmitted mark signal to derive a mark pulse and stretches a space signal into a period of time longer than that of the transmitted space signal, while said second delay network compresses a space signal into a period of time shorter than that of the transmitted space signal to derive a space pulse and stretches a mark signal into a period of time longer than that of the transmitted mark signal, and means coupled to said networks for detecting said mark and said space pulses.

3. A pulse-code communication system for transmitting pulse-coded mark and space intelligence signals between a transmitting station and a receiving station comprising a transmitting station including means for generating a carrier wave, means coupled to said generating means for modulating the frequency of said carrier wave as a monotonic function of time from a first predetermined frequency to a second predetermined frequency to represent a mark signal and for modulating the frequency of said carrier wave as a monotonic function of time from said second to said first frequency to represent a space signal, and means coupled to said modulating means for transmitting said modulated carrier wave; a receiving station including means for receiving said modulated carrier wave, a first frequency responsive delay network coupled to said receiving means for delaying said carrier wave a first predetermined time interval when its frequency corresponds to said first frequency and for delaying said carrier wave a second predetermined time interval when its frequency corresponds to said second frequency, a second frequency responsive delay network coupled to said receiving means for delaying said carrier wave by said first time interval when its frequency corresponds to said second frequency and for delaying said carrier wave by said second time interval when its frequency corresponds to said first frequency, said predetermined time intervals being selected in such a manner that said first delay network compresses a mark signal into a period of time shorter than that of the transmitted mark signal to derive a mark pulse and stretches a space signal into a period of time longer than that of the transmitted space signal, while said second delay network compresses a space signal into a period of time shorter than that of the transmitted space signal to derive a space pulse and stretches a mark signal into a period of time longer than that of the transmitted mark signal, and a detector and amplitude discriminator coupled to said networks for detecting said mark and said space pulses.

4. A pulse-code communication system for transmitting intelligence signals between a transmitting station and a receiving station comprising a transmitting station including means for generating a carrier wave, means coupled to said generating means for modulating the frequency of said carrier wave as a predetermined function of time from a first predetermined frequency to a second predetermined frequency to represent a mark signal and for modulating the frequency of said carrier wave as a predetermined function of time from said second to said first frequency to represent a space signal, and means coupled to said modulating means for transmitting said modulated carrier wave; a receiving station including means for receiving said modulated carrier wave, apparatus coupled to said receiving means for heterodyning said received carrier wave including oscillator and modulator means for deriving a heterodyned carrier wave having a frequency which varies as a function of time from a third predetermined frequency to a fourth predetermined frequency in response to a mark signal and which varies from said fourth frequency to said third frequency in response to a space signal, and a frequency responsive delay network coupled to said oscillator and modulator means for compressing a carrier wave whose frequency varies from said third to said fourth frequency into a pulse occurring after the occurrence of a corresponding transmitted signal but having a time duration shorter than that of said corresponding signal and for stretching a carrier wave whose frequency varies from said fourth to said third frequency into a stretched signal having a time duration longer than that of the corresponding transmitted signal, and detector and amplitude discriminator means coupled to said delay network for detecting said compressed pulses and discriminating against said stretched signals.

5. A pulse-code communication system for transmitting intelligence signals between a transmitting station and a receiving station comprising a transmitting station including means for generating a carrier wave, means coupled to said generating means for modulating the frequency of said carrier wave as a predetermined function of time from a first predetermined frequency to a second predetermined frequency to represent a mark signal and from modulating the frequency of said carrier wave as a predetermined function of time from said second to said first frequency to represent a space signal, and means coupled to said modulating means for transmitting said modulated carrier wave; a receiving station including means for receiving said modulated carrier wave, apparatus coupled to said receiving means for heterodyning said received carrier wave including oscillator and modulator means for deriving a heterodyned carrier wave having a frequency which varies as a function of time from a third predetermined frequency to a fourth predetermined frequency in response to a mark signal and which varies from said fourth frequency to said third frequency in response to a space signal, a first frequency responsive delay network coupled to said oscillator and modulator means for compressing a carrier wave whose frequency varies from said third to said fourth frequency into a mark pulse occurring after the occurrence of a corresponding transmitted mark signal but having a time duration shorter than that of said corresponding mark signal and for stretching a carrier wave whose frequency varies from said fourth to said third frequency and representing a space signal into a stretched signal having a time duration longer than that of the corresponding transmitted space signal, and a second frequency responsive delay network coupled to said oscillator and modulator means for compressing a carrier wave whose frequency varies from said fourth to said third frequency into a space pulse occurring after the occurrence of a corresponding transmitted space signal but having a time duration shorter than that of said corresponding space signal and for stretching a carrier wave whose frequency varies from said third to said fourth frequency and representing a mark signal into a stretched signal having a time duration longer than that of the corresponding transmitted mark signal, and detector and amplitude disccriminator means coupled individually to said delay network for separately detecting said mark and space pulses and discriminating against said stretched signals.

6. A pulse-code communication system for transmitting pulse-coded mark and space intelligence signals between a transmitting station and a receiving station comprising a transmitting station including means for generating a carrier wave, means coupled to said generating means for modulating the frequency of said carrier wave as a substantially linear function of time from a first to a second predetermined frequency, a mark oscillator having a first predetermined frequency, a space oscillator having a different predetermined frequency, a source of a coded input signal, a modulator coupled to said means for modulating, means coupled to said source and to said oscillators for selectively coupling one of said oscillators to said modulator for deriving a first modulated carrier wave having a frequency which varies substantially linearly from a first predetermined frequency to a second predetermined frequency to represent a mark signal or for deriving a second modulated carrier wave having a frequency which varies substantially linearly from said second to said first frequency to represent a space signal, and means coupled to said modulator for transmitting said modulated carrier wave; a receiving station including means for receiving said modulated carrier wave, a mark oscillator, a space oscillator, a mark modulator coupled to said mark oscillator and to said means for receiving for heterodyning the frequency of said modulated carrier wave so that its frequency varies substantially linearly from said first to said second predetermined frequency to represent a mark signal while varying substantially linearly from said second to said first frequency to represent a space signal, a space modulator coupled to said space oscillator and to said means for receiving for heterodyning said modulated carrier wave so that its frequency varies substantially linearly from said first frequency to said second frequency in response to a space signal while varying substantially linearly from said second to said first frequency in response to a mark signal, a first frequency responsive delay network coupled to said mark modulator for delaying said carrier wave a first predetermined time interval in response to said first frequency and for delaying said carrier wave a second predetermined time interval in response to said second frequency, a second frequency responsive delay network coupled to said space modulator and substantially identical to said first delay network, said predetermined time intervals being selected in such a manner that said first delay network compresses a mark signal into a period of time shorter than that of a transmitted mark signal to derive a mark pulse and stretches a space signal into a period of time longer than that of a transmitted space signal, while said second delay network compresses a space signal into a period of time shorter than that of a transmitted space signal to derive a space pulse and stretches a mark signal into a period of time longer than that of a transmitted mark signal, and detector and amplitude discriminator means coupled individually to said networks for separately detecting said mark and said space pulses.

7. A pulse-code communication system for transmitting pulse-coded mark and space intelligence signals between a transmitting station and a receiving station comprising a transmitting station including means for generating a carrier wave, means coupled to said generating means for modulating the frequency of said carrier wave as a substantailly linear function of time from a first to a second predetermined frequency, a mark oscillator having a first predetermined frequency, a space oscillator having a different predetermined frequency, a source of a coded input signal, a modulator coupled to said means for modulating, means coupled to said source and to said oscillators for selectively coupling one of said oscillators to said modulator for deriving a first modulated carrier wave having a frequency which varies substantially linearly from a first predetermined frequency to a second predetermined frequency to represent a mark signal or for deriving a second modulated carrier wave having a frequency which varies substantially linearly from said second to said first frequency to represent a space signal, and means coupled to said modulator for transmitting said modulated carrier wave; a receiving station including means for receiving said modulated carrier wave, a first frequency responsive delay network coupled to said means for receiving for delaying said carrier wave a first predetermined time interval in response to said first frequency and for delaying said carrier wave a second predetermined time interval in response to said second frequency, a second frequency responsive delay network coupled to said means for receiving for delaying said carrier wave by said second time interval in response to said first frequency and for delaying said carrier wave by said first time interval in response to said second frequency, said predetermined time intervals being selected in such a manner that said first delay network compresses a mark signal into a period of time shorter than that of a transmitted mark signal to derive a mark pulse and stretches a space signal into a period of time longer than that of a transmitted space signal, while said second delay network compresses a space signal into a period of time shorter than that of a transmitted space signal to derive a space pulse and stretches a mark signal into a period of time longer than that of a transmitted mark signal, and detector and amplitude discriminator means coupled individually to said networks for separately detecting said mark and said space pulses.

8. A pulse-code communication system for transmitting intelligence signals between a transmitting station and a receiving station comprising a transmitting station including means for generating a carrier wave, means coupled to said generating means for modulating the frequency of said carrier wave as a predetermined function of time from a first predetermined frequency to a second predetermined frequency to represent the presence of an intelligence signal, and means coupled to said modulating means for transmitting said modulated carrier wave; a receiving station including means for receiving said modulated carrier wave, and a frequency responsive delay network coupled to said means for receiving for delaying a carrier wave portion corresponding to said first frequency by an amount so that it occurs after the termination of the modulation of said carrier wave and for delaying a carrier wave portion corresponding to said second frequency by a shorter time interval to coincide substantially in time with said first delayed portion, whereby a transmitted intelligence signal is compressed into a period of time shorter than that of the transmitted signal and has a larger amplitude to derive an intelligence pulse.

9. A pulse-code communication system for transmitting intelligence signals between a transmitting station and a receiving station comprising a transmitting station including means for generating a carrier wave, means coupled to said generating means for modulating the frequency of said carrier wave as a substantially linear function of time from a first predetermined frequency to a second predetermined frequency to represent the presence of an intelligence signal, and means coupled to said modulating means for transmitting said modulated carrier wave; a receiving station including means for receiving said modulated carrier wave, a frequency responsive delay network coupled to said means for receiving for delaying a carrier wave portion corresponding to said first frequency by an amount so that it occurs after the termination of the modulation of said carrier wave and for delaying a carrier wave portion corresponding to said second frequency by a shorter time interval to coincide substantially in time with said first delayed portion, whereby a transmitted intelligence signal is compressed into an intelligence pulse having a duration shorter than that of the transmitted signal and having a larger amplitude, and detector and amplitude discriminator means coupled to said network for detecting said intelligence pulse.

10. In a pulse-code communication system of the type where pulse-coded mark and space intelligence signals are transmitted, a mark signal being represented by a carrier wave having its frequency modulated as a predetermined function of time from a first frequency to a second frequency, a space signal being represented by said carrier wave having its frequency modulated as a predetermined function of time from said second to said first frequency, a receiving station including means for receiving said modulated carrier wave, and apparatus coupled to said receiving means for discriminating between said mark and space signals, said apparatus including frequency responsive delay network means for delaying said carrier wave a first predetermined time interval when its frequency corresponds to said first frequency and for delaying said carrier wave a second predetermined time interval when its frequency corresponds to said second frequency, and said predetermined time intervals being selected in such a manner that said delay network means compresses a mark signal into a period of time shorter than that of the transmitted mark signal to derive a mark pulse and stretches a space signal into a period of time longer than that of the transmitted space signal.

11. In a pulse-code communication system of the type where pulse-coded mark and space intelligence signals are transmitted, a mark signal being represented by a carrier wave having its frequency modulated as a predetermined function of time from a frequency to a second frequency, a space signal being represented by said carrier wave having its frequency modulated as a predetermined function of time from said second to said first frequency, a receiving station including means for receiving said modulated carrier wave, and apparatus coupled to said receiving means for discriminating between said mark and space signals, said apparatus including a first frequency responsive delay network for delaying said carrier wave a first predetermined time interval when its frequency corresponds to said first frequency and for delaying said carrier wave a second predetermined time interval when its frequency corresponds to said second frequency, said apparatus further including a second frequency responsive delay network means for delaying said carrier wave by said second signal time interval when its frequency corresponds to said first frequency and for delaying said carrier wave by said first time interval when its frequency corresponds to said second frequency, said predetermined time intervals being selected in such a manner that said first delay network compresses a mark signal into a period of time shorter than that of the transmitted mark signal to derive a mark pulse and stretches a space signal into a period of time longer than that of the transmitted space signal, while said second delay network compresses a space signal into a period of time shorter than that of the transmited space signal to derive a space pulse and stretches a mark signal into a period of time longer than that of the transmitted mark signal.

References Cited in the file of this patent

UNITED STATES PATENTS

| | | |
|---|---|---|
| 2,113,214 | Lock | Apr. 5, 1938 |
| 2,426,216 | Hight | Aug. 26, 1947 |
| 2,446,077 | Crosby | July 27, 1948 |